United States Patent [19]

Bartholic et al.

[11] 4,274,942
[45] Jun. 23, 1981

[54] CONTROL OF EMISSIONS IN FCC REGENERATOR FLUE GAS

[75] Inventors: David B. Bartholic, Watchung; Don S. Chin, Woodbridge, both of N.J.

[73] Assignee: Engelhard Minerals & Chemicals Corporation, Edison, N.J.

[21] Appl. No.: 26,935

[22] Filed: Apr. 4, 1979

[51] Int. Cl.³ .................................................. C10G 11/18
[52] U.S. Cl. .............................. 208/113; 208/48 R; 208/DIG. 1; 208/150; 208/151; 208/164; 252/419; 252/420; 422/145; 423/244
[58] Field of Search ............... 208/113, 164, 150–151, 208/48 R, 120; 423/244, 652; 422/145; 252/416–419

[56] References Cited

U.S. PATENT DOCUMENTS

| | | | |
|---|---|---|---|
| 2,394,710 | 2/1946 | McAfee | 252/417 X |
| 2,398,739 | 4/1946 | Greensfelder et al. | 252/417 X |
| 2,414,002 | 1/1947 | Thomas et al. | 208/164 |
| 2,428,691 | 10/1947 | Tyson | 208/150 |
| 2,456,707 | 12/1948 | Keith | 208/150 |
| 2,463,434 | 3/1949 | Shankland | 208/151 |
| 2,518,775 | 8/1950 | Guyer | 208/78 |
| 3,691,063 | 9/1972 | Kirk | 208/91 |
| 3,949,684 | 4/1976 | Copeland | 423/244 X |
| 3,983,030 | 9/1976 | Rosynek et al. | 208/253 |
| 4,001,375 | 1/1977 | Longo | 423/244 |
| 4,010,094 | 3/1977 | McKinney | 208/164 |
| 4,064,039 | 12/1977 | Penick | 208/160 |
| 4,115,249 | 9/1978 | Blanton et al. | 208/120 |
| 4,146,463 | 3/1979 | Radford et al. | 208/120 |
| 4,153,535 | 5/1979 | Vasalos et al. | 208/120 |
| 4,176,084 | 11/1979 | Luckenbach | 252/417 |

Primary Examiner—Delbert E. Gantz
Assistant Examiner—G. E. Schmitkons
Attorney, Agent, or Firm—Inez L. Moselle

[57] ABSTRACT

Process and system are described for control of sulfur oxide in emissions to the atmosphere from regenerators of Fluid Catalytic Cracking Units (FCC) in a manner which improves the operation of the regenerator and/or the reactor. Spent FCC cracking catalyst containing sulfur-bearing inactivating carbonaceous deposit is partially oxidized, preferably in the presence of steam, thereby producing a mixture of CO and $CO_2$ and releasing sulfur in the resulting reducing atmosphere as vaporous hydrogen sulfide before the catalyst is regenerated, whereby the amount of sulfur convertible to noxious SOx in the regenerator flue gas is reduced. By the disclosed process and system, the quantity of oxygen introduced is predetermined and controlled in response to hydrogen content of the coke on the partially oxidized catalyst or an SOx analyzer associated with the regenerator can be used as a control tool. Preferably, spent catalyst is partially oxidized in the presence of steam in a vessel separate from the regenerator and reactor, whereby the effluent can be utilized as a source of low BTU gas.

25 Claims, 1 Drawing Figure

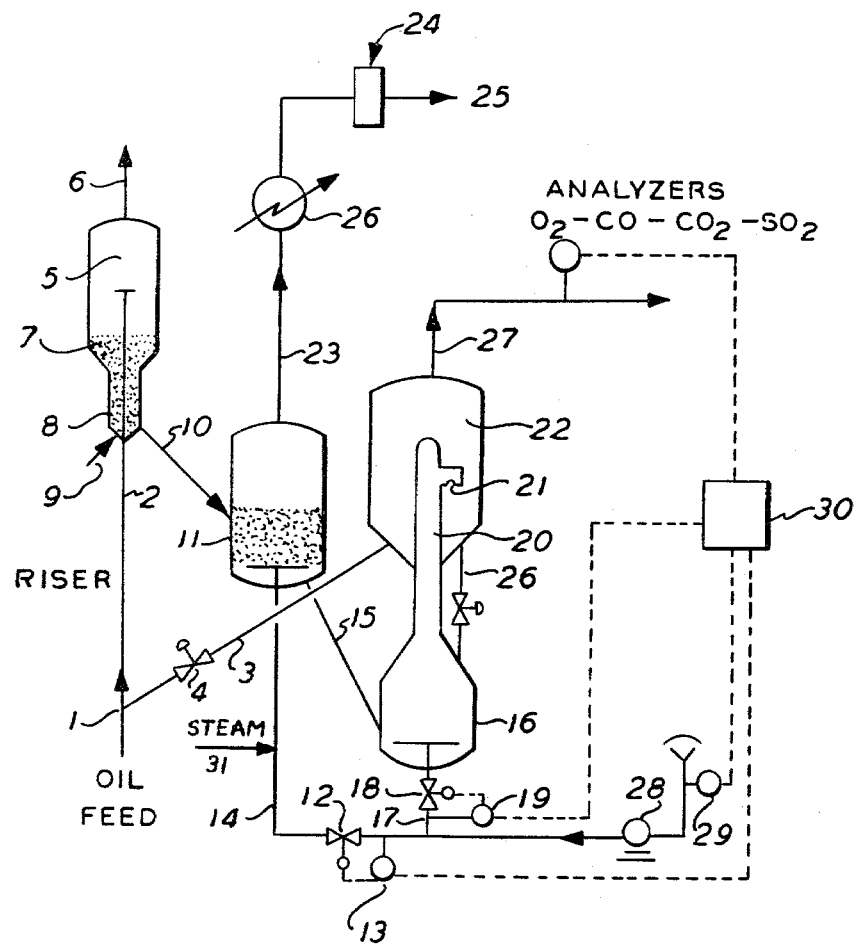

CONTROL OF EMISSIONS IN FCC REGENERATOR FLUE GAS

FIELD OF THE INVENTION

The invention is concerned with operation of catalytic cracking units, especially FCC units, for control of undersirable gases in the flue gas released from the regenerators. More particularly, the invention provides an improvement over known techniques for reducing or minimizing the content of sulfur oxides in regenerator flue gases without adverse effect on the operation of the reactor or the regenerator. The invention contemplates removing at least part of the sulfur and a portion of the hydrocarbon contained in the carbonaceous deposit on spent cracking catalyst by controlled partial coke burning to produce a gaseous mixture including hydrogen sulfide, carbon monoxide and carbon dioxide before completing burning of the coke in a regenerator. This invention can utilize the partial oxidation system to enhance the efficiency of the cracking reaction and/or the regeneration system or to provide a source of low BTU gas.

Catalytic cracking has been characterized by certain basic steps repeated in cyclic manner. The catalysts are primarily combinations of silica and alumina. Other combinations of oxides have been shown to be effective; these others have not achieved continued commercial usage over any substantial period of time. The highly porous catalysts are characteristically possessed of extensive surface area of acidic nature. During a relatively short period of time, hydrocarbon charge, such as gas oil, undergoes profound conversions of complex nature on contact with those surfaces at elevated temperatures upwards of about 850° F. and essentially atmospheric pressure. The temperature may range up to about 1100° F. and the pressure on incoming charge is usually only enough to overcome pressure drop through the reactor and associated product recovery facilities, say 30 to 50 psig.

The conversions taking place in the presence of the cracking catalyst include scission of carbon-to-carbon bonds (simply cracking), isomerization, polymerization, dehydrogenation, hydrogen transfer and others leading to lighter, lower molecular weight compounds as important desired products. In many installations motor gasoline of end point near about 400° F. is a primary product and cracking units are often operated to maximize high quality gasoline within constraints imposed by ability to profitably market the unavoidable by-products. The reactions on cracking catalyst also produce hydrocarbons of very low volatility and very high carbon content which remain on the active surfaces of the catalyst and mask the active sites, rendering the catalyst inactive. Those deposits of heavy carbonaceous matter (commonly called "catalytic coke") can be removed along with absorbed hydrocarbons (commonly called "absorbed coke") by burning with air to restore the active surface and thus regenerate the acitivity of the catalyst. In commercial plants for practice of catalytic cracking, catalyst inactivated by coke is purged of volatile hydrocarbons, as by steaming, and contacted with air at elevated temperature to burn off absorbed and catalytic coke.

Combustion of the coke in the regenerator system generates carbon dioxide, carbon monoxide and water as combustion products and releases large amounts of heat. To a very considerable extent, the heat so released has been applied to supply the endothermic heat of reaction during the cracking phase of the cycle. In its earliest stages, catalytic cracking was conducted in fixed beds of catalyst provided with heat exchange tubes through which a heat transfer fluid was circulated to abstract heat during regeneration and supply heat during cracking. Continuity of operation was achieved by a complex system of manifolds and valves serving a plurality of reactors such that one is used for cracking while two or more others were purged of volatiles, regenerated, again purged and ready to assume the cracking function as catalyst in the first reactor became spent.

Further development made available systems in which the catalyst is moved continuously through a reactor, purged, transferred to a regenerator, again purged and returned to the reactor. These moving catalyst systems are able to dispense with the circulating heat transfer medium and instead employ the catalyst itself as a medium for conveying heat from the regenerator to the reactor. The early catalysts such as acid treated clays and synthetic amorphous silica-alumina composites resulted in deposition of quantities of coke in excess of the amounts which on complete combustion to carbon dioxide and water will supply the heat of reaction required by the reactor. In some installations, a portion of the heat was withdrawn by heat exchange coils in the regenerator. That practice was followed in the moving compact bed process known as Thermofor Catalytic Cracking (TCC). Another expedient is to circulate a portion of catalyst from the regenerator through a cooling heat exchanger and back to the regenerator. That practice was found suitable for systems in which a finely divided catalyst is suspended in the hydrocarbon charge in the reactor and in the combustion air in the regenerator. These suspended catalyst systems applied the fluidized solids phenomenon and are classed generally as Fluid Catalytic Cracking (FCC).

Characteristic of all the systems for many years was a high content of carbon monoxide (CO) in the fluid gas from the regenerator, a result of incomplete combustion or partial utilization of the fuel value of the coke. CO in the flue gas is undesirable for other reasons. That combustible gas can burn in regenerator gas discharge equipment and in flues leading to temperatures which damage those facilities. The loss of potential fuel value has been avoided by providing "CO boilers" in which the CO is burned in contact with steam generation tubes, thus recovering sensible heat from the flue gas as well as fuel value of the CO.

As designs of moving catalyst systems for charging heavier stocks were developed, the cracker received some hydrocarbons in liquid form, requiring heat input for vaporization of charge, heating the charge to reaction temperature and for endothermic heat of reaction. The "heat balanced" FCC design aids in satisfaction of these requirements. Typically, that design provides a heat sensor in the reacted vapors before removal from the reactor. An automatic control of the valve in the line for return of hot regenerated catalyst from the regenerator to the reactor assures return of that amount of hot regenerated catalyst which will maintain reactor top temperature at a desired set point. It will be seen that this control also sets an important reactor parameter, namely ratio of catalyst to oil (C/O), corresponding to space velocity in fixed bed reactors. It follows that, for a given set of regenerator conditions, C/O is a dependent variable not subject to independent control by the operator.

The advent of zeolite cracking catalyst as described in U.S. Pat. No. 3,140,249 introduced new considerations in catalytic cracking design and practice. Such catalysts are highly active, inducing more profound conversion of hydrocarbon charge stock than the older catalysts. In addition they are more selective in that a larger proportion of the conversion products are motor gasoline components with lesser proportions of gas and coke. Because of that increased selectivity, the zeolite cracking catalyst rapidly became the catalyst of choice, particularly in areas of high gasoline demand, such as the United States. The more active catalyst has been effectively applied in FCC Units at short catalyst contact times, such as the modern riser reactor units in which hot catalyst is dispersed in a column of charge rising through a conduit to an enlarged catalyst disengaging zone. Contact times of 20 seconds or less are common practice in such units. Such short contact times place a premium on high activity of the catalyst. Since activity of the regenerated catalyst is a function of residual coke remaining on the catalyst after regeneration, it becomes important to reduce residual coke to the lowest level economically attainable.

The extent of coke burning is a function of time and temperature. Rate of coke burning increases with increased temperature and catalysts regenerated to lower residual coke level have higher activity. In any given installation, the volume of the regenerator imposes a constraint on time of contact between catalyst and regeneration air. Temperature of regeneration is constrained by thermal stability of the catalyst which suffers unduly rapid loss of activity on exposure to moisture of the regeneration air at temperatures upwards of about 1400° F. In addition, the regeneration temperature must be held to a level which will not cause damage to vessel internals. As regeneration gas rises from a dense bed in a regenerator, burning of CO can take place in a "dilute phase" containing only a small amount of catalyst. Because there is very little catalyst to absorb the heat thus released, the temperature of the gas rises rapidly and may reach levels which cause damage to the cyclones which separate entrained catalyst from regenerator fume, plenum chambers and flues for discharge of the flue gas. This may be combated by injecting water or steam to these internals.

Better techniques have been recently proposed and adopted in many plants. According to the system of U.S. Pat. No. 3,909,392, catalyst from the dense bed of the regenerator is educted through tubes to the disperse phase, thus providing catalyst mass to absorb heat of CO combustion and return that heat to the dense bed as the catalyst falls back into that bed. A widely practiced technique causes CO combustion to take place in the dense bed by use of a catalyst promoted with platinum or the like in very small amounts. See U.S. Pat. No. 4,072,600. By transferring the heat of burning CO to the dense bed, these developments make higher regeneration temperatures available to regenerate catalyst to lower residual coke levels, hence higher activity.

Regeneration temperature about 1250° F., preferably around 1300° F. and up to about 1375° F., become feasible at residual coke levels of 0.1% by weight on catalyst. The necessary result of regeneration at these increased temperatures is that the automatic control to maintain preset reactor top temperature will reduce the rate of catalyst flow from regenerator to reactor below the rates for lower regeneration temperature, thus reducing C/0. In addition, catalyst at these high temperatures will heat a portion of the charge to excessive levels at which thermal cracking occurs with resultant production of gas, olefins, and coke.

Operators of FCC Units have also been concerned about emissions of sulfur dioxide and sulfur trioxide (SOx) in the regenerator flue gas. The hydrocarbon feeds processed in commercial FCC units normally contain sulfur. It has been found that about 2-10% or more of the sulfur in a hydrocarbon stream processed in an FCC system is transferred from the hydrocarbon stream to the cracking catalyst, becoming part of the coke formed on the catalyst particles within the FCC cracking or conversion zone. Thus sulfur is eventually removed from the conversion zone on the coked catalyst which is sent to the FCC regenerator. Accordingly, about 2-10% or more of the feed sulfur is continuously passed from the conversion zone into the catalyst regeneration zone with the coked catalyst in an FCC unit.

In an FCC catalyst regenerator, sulfur contained in the coke is burned, along with the coke carbon, forming primarily gaseous sulfur dioxide and sulfur trioxide. These gaseous sulfur compounds become part of the flue gas produced by coke combustion and are conventionally removed from the regenerator in the flue gas.

It has been shown that SOx in the regenerator flue gas can be substantially cut back by including in the circulating catalyst inventory an agent capable of reacting with an oxide of sulfur in an oxidizing atmosphere or an environment which is not of substantial reducing nature to form solid compounds capable of reduction in the reducing atmosphere of the FCC reactor to yield $H_2S$. Upon such reduction, the sulfur leaves the reactor as gaseous $H_2S$ with the products of cracking. Those cracking products normally contain $H_2S$ and organic compounds of sulfur resulting from the cracking reaction. Since these sulfur compounds are detrimental to the quality of motor gasoline and fuel gas by-products, the catalytic cracker is followed by downstream treating facilities for removal of sulfur compounds. Thus the gaseous fractions of cracked product may be scrubbed with an amine solution to absorb $H_2S$ which is then passed to facilities for conversion to elemental sulfur, e.g., a Claus plant. The additional $H_2S$ added to the cracker product stream by chemical reduction in the reactor of the solid sulfur compounds formed in the regenerator imposes little additional burden on the sulfur recovery facilities.

The agent circulated with the catalyst inventory for removal of sulfur may be an integral part of the cracking catalyst particles or may be constituted by separate particles having essentially the same fluidization properties as the cracking catalyst. Suitable agents for the purpose have been described in a number of patents, including, by way of example, U.S. Pat. No2. 4,071,436 and 3,834,031. Also see U.S. Pat. Nos. 3,699,037, and 3,949,684. Similar use of cerium oxide is shown by U.S. Pat. No. 4,001,375. In practice the concept of diverting sulfur emissions from regenerator flue gas to reactor effluent by means of reagents capable of associating with oxides of sulfur in the regenerator and releasing them as hydrogen sulfide leaves much to be desired for operators of certain refineries. Generally, association of metal oxides with SOx in the regenerator requires an abundance of oxygen which cannot be tolerated in some regeneration systems and some potentially effective promoters also promote combustion of carbon thereby leading to abnormally high regenerator temperatures. Since SOx pickup by metal oxides is frequently more effective when carried out at temperatures lower than those existing in many commercial regenerators, this technique for reducing SOx emissions leaves much to be desired.

SUMMARY OF THE INVENTION

The present invention represents a departure from generally known means for reducing SOx emissions in regenerator flue gas that arise from sulfur contained in coke laid down on cracking catalyst when a sulfur-bearing hydrocarbon feedstock is cracked. In accordance with this invention, at least part of such sulfur is removed from spent catalyst as a vapor before the spent catalyst is regenerated, whereby SOx emissions in the regenerator flue gas are reduced. Removal of sulfur as a vapor prior to regeneration is accomplished, in accordance with this invention, by injecting a controlled amount of air or oxygen into the spent catalyst in a stripper, with or separate from the steam used in the stripper (or in a separate vessel used as the stripper), in order to burn absorbed hydrocarbons from the catalyst. The quantity of air or oxygen injected is limited to an amount that results in controlled partial oxidation and produces a vaporous effluent containing hydrogen sulfide, carbon monoxide, carbon dioxide and steam and is free or essentially free from SOx. These vapors are separated from the resulting partially regenerated catalyst before the catalyst is charged to the regenerator for burning of residual coke, thereby reducing SOx emissions in the regenerator flue gas.

Since hydrocarbons and hydrogen are also burned in the sulfur rejection system of the invention, hydrocarbon emissions from the regenerator are reduced and unit regenerator capacity can be increased. This is an important advantage for those refineries which are limited by regenerator capacity since, in effect, the load on the regenerators is reduced.

Also since this system operates to produce incomplete combustion of coke to carbon monoxide, it can be used with complete combustion regenerators as a means of reducing the total heat released (total lower heat of combustion of the coke) in the regeneration of the catalyst. This results in lower regenerator temperatures or lower steam production in regenerator steam coils. In a heat balanced unit, the operation of a regenerator at a lower temperature results in an increased catalyst to oil ratio in the reactor. Generally, this results in increased catalyst selectivity. In effect, practice of the invention provides means for improving the cracking operation while also reducing SOx emissions in the regenerator flue gas.

In a preferred embodiment of the invention sulfur rejection by controlled partial oxidation of coke on catalyst is accomplished in a separate vessel used as a steam stripper, this being a departure from the usual stripper which is an integral part of the reactor. When the separate vessel is used the vaporous effluent is isolated from reactor and regenerator gases and therefore can be treated by known means to remove hydrogen sulfide and organic sulfur compounds which may also be present. The remainder is useful as low BTU gas.

It is also contemplated that additional gas such as FCC dry gas rich in hydrogen can be added to the charge in a separate sulfur rejection system to give optimum removal of sulfur in coke when spent catalyst is partially oxidized in accordance with invention.

DESCRIPTION OF THE DRAWING

Typical apparatus for practice of the invention is shown in diagrammatic elevation in the single FIGURE of drawing annexed hereto. As illustrated in that diagram, a hydrocarbon feed 1 such as a gas oil boiling from about 600° F. up to 1100° F. is passed after preheating thereof to the bottom portion of riser 2 for admixture with hot regenerated catalyst introduced by standpipe 3 provided with flow control valve 4. A suspension of catalyst in hydrocarbon vapors at a temperature of at least about 950° F. but more usually at least 1000° F. is thus formed in the lower portion of riser 2 for flow upwardly therethrough under hydrocarbon conversion conditions. The suspension initially formed in the riser may be retained during flow through the riser for a hydrocarbon residence time in the range of 1 to 20 seconds.

The hydrocarbon vapor-catalyst suspension formed in the riser reactor is passed upwardly through riser 2 under hydrocarbon conversion conditions of at least 900° F. and more usually at least 1000° F. before discharge into separation zone 5 above the riser discharge. There may be a plurality of cyclone separator combination, not shown, comprising first and second cyclonic separation means attached to or spaced apart from the riser discharge for separating catalyst particles from hydrocarbon vapors, as is customary in the art. These hydrocarbon vapors together with gasiform material separated by stripping gas as defined below are passed by conduit 6 to fractionation equipment not shown. Catalyst separated from hydrocarbon vapors in the cyclonic separation means is passed to a dense fluid bed of separated catalyst 7 retained about an upper portion of riser conversion zone 2. Catalyst bed 7 is maintained as a downwardly moving fluid bed of catalyst countercurrent to rising gasiform material. The catalyst passes downwardly through a stripping zone 8 immediately therebelow and counter-current to rising stripping gas, typically steam, introduced to a lower portion thereof by conduit 9. Baffles may be provided in the stripping zone to improve the stripping operation.

The catalyst is maintained in stripping zone 8 for a period of time sufficient to effect a higher temperature desorption of feed deposited compounds which are then carried overhead by the stripping gas. The stripping gases with desorbed hydrocarbons pass through the cyclonic separating means wherein entrained catalyst fines are separated and returned to the catalyst bed. The hydrocarbon conversion zone comprising riser 2 may terminate in an upper enlarged portion of the catalyst collecting vessel with the commonly known bird cage discharge device or an open end "T" connection may be fastened to the riser discharge which is not directly connected to the cyclonic catalyst separation means. The cyclonic separation means may be spaced apart from the riser discharge so that an initial catalyst separation is effected by a change in velocity and direction of the discharged suspension so that vapors less encumbered with catalyst fines may then pass through one or more cyclonic separation means before passing to a product separation step. In any of these arrangements gasiform materials comprising stripping gas, hydrocarbon vapors and desorbed sulfur compounds are passed from the separation means 5 for removal with hydrocarbon products of the cracking operation by conduit 6.

Gasiform material comprising hydrocarbon vapors is passed by conduit 6 to a product fractionating step not shown. Hot stripped catalyst at an elevated temperature is withdrawn from a lower portion of the stripping zone by conduit 10 for transfer to the first stage of catalyst regeneration zone 11, presently to be described.

The first stage of catalyst regeneration which constitutes the sulfur rejection system may be of any desired style of either dense bed or "fast fluid" riser or any combination of these and is operated to burn only the coke containing hydrogen and liberating the sulfur as hydrogen sulfide. Air for burning is injected through valve 12 controlled by flow recorder controller (FRC) 13 through conduit 14 into the first stage regeneration vessel 11 where the spent catalyst passes by conduit 10 into the lower section of the first stage regenerator 11. In regenerator 11 it enters a dense fluidized bed maintained by air introduced by conduit 14 and steam introduced by conduit 31. Catalyst from the dense bed in vessel 11 which is entrained as the products of partial oxidation pass upwardly through the dense bed in vessel 11 is returned to the dense bed in the usual manner, as by cyclones not shown. The essentially catalyst-free combustion products from vessel 11 are discharged at line 23 through an exchanger 26 to recover sensible heat as steam in boilers, or as useful work in turbines or the like, all as is usual in the art. This cools the combustion products before they enter the treating section which removes the sulfur compounds produced by partial oxidation of the coke in the spent catalyst so that the sulfur-free low BTU gas containing mainly carbon monoxide, carbon dioxide and nitrogen can be discharged through line 25 through means to recover its heat of combustion as steam in boilers or in fired heaters.

The partially regenerated catalyst at elevated temperature, 50° to 300° F. hotter than the spent catalyst from stripper 8, and free (or essentially free) of any hydrogen in the coke and sulfur compounds is withdrawn from the lower portion of the first stage regeneration zone 11 by conduit 15 for transfer to the second stage of catalyst regeneration, presently to be described.

The regenerator may be of any desired style, but is preferably designed and operated to yield regenerated catalyst at minimum residual coke levels after regeneration. A modern version of regeneration is characterized by "fast fluid" riser to which catalyst suspended in regeneration gas is supplied from a dense fluidized bed undergoing regeneration at high temperature. The spent catalyst from the first stage of regeneration and hot catalyst separated at the top of the riser are both introduced to the dense fluidized bed where the "fire" for regenerating spent catalyst is lighted by the hot regenerated catalyst so recycled. See U.S. Pat. Nos. 3,893,812 and 3,926,778.

As seen in the annexed drawing, partially regenerated catalyst from vessel 11 passes by line 15 to an enlarged lower section 16 of the regenerator where it enters a dense fluidized bed maintained by air introduced by conduit 17 through valve 18 controlled by pressure recorder controller 19. Catalyst from the dense bed in section 16 is entrained by hot regeneration gas to pass upwardly through a riser 20 to discharge port 21 into enlarged disengaging zone 22. Disengaging zone 22 may be equipped with cyclone separators and dip legs, not shown, in the manner usual in this art. The catalyst regenerated at high temperature in section 16 and riser 20 is collected as a fluidized bed in the lower portion of disengaging zone 22 about riser 20. A portion of the hot catalyst collected is recycled by line 26 back to the bed in the lower section 16 for the purpose stated. Another portion for return to the riser reaction 2 is withdrawn by standpipe 3.

Hot regeneration fume essentially free of SOx and water vapor is withdrawn from disengaging zone 22 and passes by line 27 (where analyzers for oxygen, carbon monoxide, carbon dioxide, and $SO_2$ are installed) through means to recover its sensible heat as steam in boilers or as useful work in turbines or the like, all as is usual in the art.

Since the hydrogen in the coke has been burned in the first stage of regeneration which is conducted at lower temperature with coke on the catalyst, the products of combustion in the second stage of regeneration will not contain water vapor. Therefore one of the advantages of this two stage regeneration system is to reduce the hydrothermal deactivation of the fluid cracking catalyst. This will result in higher catalyst activity in the unit.

Operation of this unit is similar to any typical FCC except for the air control system which is unique and different. The total air flow to the first and second stage regenerator is controlled by flow recorder controller 29 which resets the blower 28 speed or inlet vanes. All signals on the air FRC 13 and FRC 29, pressure recorder controller signal 19, and analyzer signals for $O_2$, CO, $CO_2$ and $SO_2$ on flue gas line 27 are fed into computer 30 which compares signals, controls air valves 12 and 18 and blower 28 speed and computes hydrogen in the coke as discussed below.

For the complete CO combustion mode of control, air valve 18 is the main control for excess $O_2$ in flue gas line 27. The control signal for excess oxygen is set at between 0.5 and 3 mole % oxygen in the flue gas line 27 and this control signal is used to increase or decrease the blower 28 speed through 29 to increase or decrease air flow. Pressure controller 19 reacts to a call for more oxygen in the flue gas line 27 by increasing of blower speed which increases discharge pressure and opens valve 18 and likewise on decreasing blower speed which lowers blower discharge pressure, closes valve 18 and reduces oxygen in flue gas line 27. In a conventional operation, where there is more than 1% CO in the flue gas line 27, the blower speed would be reset by a flue gas temperature controller rather than the oxygen controller which would increase blower 28 speed and air flow 29 to regenerator 16 to increase temperature.

The $O_2$, CO and $CO_2$ analyzers are used to determine the hydrogen in the coke burned in the second stage of regeneration. Computer 30 is programmed to solve Weight % HYDROGEN IN COKE =
$$\frac{107.25 - 5.10c - 5.10b + 3.09a}{107.25 - 5.10c - 6.91b + 8.92a} \times 100$$

WHERE: P1 a=Volume % CO in flue gas
b=Volume % $CO_2$ in flue gas
c=Volume % $O_2$ in flue gas The control point on the wt % hydrogen in the coke is for zero weight %. If the computer indicates a positive hydrogen in the coke burned in the regenerator, then flow controller 13 is reset to open air valve 12 increasing air 13 to the first stage, thereby increasing partial oxidation and liberating more sulfur as hydrogen sulfide in the reducing atmosphere.

As a backup system, the $SO_2$ analyzer is set to override the hydrogen in coke computer signal to increase air 13 to the first stage regenerator 11 in the event there is an SO₂ breakthrough.

DESCRIPTION OF SPECIFIC EMBODIMENT

In preferred embodiments, the present invention contemplates circulation in FCC Units of spent catalyst from a reactor operating on sulfur-bearing hydrocarbon feedstock to the dense bed of a separate vessel in which air and steam are injected below the point of charge of spent catalyst and the partially oxidized catalyst is discharged at or near the base of the unit.

Air is conveniently used as the source of oxygen and air rate must be selected with the objective of curtailing oxidation well below that point in which all coke and absorbed hydrocarbons are burned and sufficient steam and burned carbon is present as carbon monoxide to create a reducing atmosphere. Air rate is limited to that which will burn all or essentially all absorbed coke without attacking catalytic coke. In a typical cracking operation utilizing conventional hydrocarbon feedstocks, roughly ⅓ of the coke is absorbed and the remainder is catalytic. On this basis air rate can be approximated from calculations to limit combustion to provide for combustion of about ⅓ the coke yield. Commercial implementation of the invention dictates practical controls to achieve the desired partial combustion and systems described above can be utilized to vary air rate in response to fluctuations which will result in variations in coke composition and coke yield. Since catalytic coke is essentially hydrogen free, controlled partial oxidation to the extent that the partially combusted coke is hydrogen free, or essentially so, will achieve the desired limitation on partial oxidation.

A simplistic approach to the problem of sulfur in coke may prompt the question of why burning only absorbed coke without attacking catalytic coke will result in selective rejection of sulfur as compared to carbon. While not wishing to be bound to any theory, a reasonably explanation is that sulfur is associated with hydrogen in the hydrocarbons present largely, if not entirely, in that portion of coke which is absorbed. Consequently when spent catalyst is partially oxidized in accordance with this invention under conditions controlled to yield a hydrogen-free (or essentially hydrogen-free) coke, only catalytic coke which is essentially free from sulfur will be present on the partially oxidized catalyst. When such partially regenerated catalyst undergoes further regeneration to combust residual coke, there will be a reduced amount of sulfur in the coke that can eventually give rise to SOx in the regenerator flue gas.

Reactor temperatures are generally in the range of 800° to 1200° F., most normally about 1000° F. Partial controlled oxidation in accordance with this invention is at a temperature above the reactor and below the regenerator temperature, generally in the range of 900° to 1300° F., and preferably in the range of about 1000° to 1275° F. Injection of oxygen into a steam stripper to combust about a third of the coke will increase the temperature of the stripper since hydrogen and hydrocarbons are burned. Generally if reactor temperature is Rx (°F.), the sulfur rejection system will operate at about Rx +50° F. to Rx +500° F., most usually at about Rx +50° F. to Rx +200° F. For example, when the feedstock is cracked at 1000° F., a typical temperature in the sulfur rejection system will be in the range of about 1050° F. to 1200° F. The higher the temperature, the higher the vapor pressure of absorbed sulfur-bearing hydrocarbons, resulting in increased partial oxidation and reduction in sulfur and carbon associated with spent catalyst. Temperatures above 1300° F. are avoided in the sulfur rejection system since hydrogen sulfide may then burn and create a new version of the SOx problem sought to be overcome by practice of the invention. Residence time in the sulfur rejection system is generally in the range of 20 seconds to 20 minutes and steam rates ranging from about 0.5 pounds to 10 pounds/1000 pounds of catalyst circulation. In a heat balanced system, the temperature of the sulfur rejection system is set by the amount of hydrogen in the coke on spent catalyst and the amount of absorbed material associated with the spent catalyst.

Partially combusted spent catalyst from the sulfur rejection system is burned in a regenerator which may be of conventional design and operates at temperatures in the range of 1000° F. to 1600° F., most usually in the range of 1150° F. to 1400° F. Roughly two-thirds of the coke or spent catalyst is combusted in the regenerator, the other third having been removed in the sulfur rejection system.

EXAMPLES

The effect of contacting in the manner described above has been demonstrated in laboratory scale equipment. The apparatus employed is a circulating fluidized bed pilot plant which simulates behavior of commercial FCC riser reactors. The reactor is equipped to provide a stream of nitrogen through the riser and for addition of catalyst and charge. The riser is lagged and heated to maintain isothermal conditions.

In order to determine the feasibility of liberating sulfur as hydrogen sulfide in a FCC reactor as a means of reducing SOx in the regenerator flue gas, air was introduced into the FCC unit at high temperature to produce partial oxidation of the absorbed hydrocarbons.

The first test (A) was the base case using a low sulfur crude (0.58% S). The second test (B) was identical to (A) except that air was injected into the stripper at 1218 cc/min with a stripper temperature of 1200° F.

In a second series of tests a higher sulfur containing gas oil (2.45% S) was substituted for the 0.58% S feed to better evaluate the process. The same test procedures, base line operation (C) as well as air injection with stripper temperatures at (D) 930° F. and 1176° F. (E) were carried out.

Conditions of contact and resulting products are shown in table form.

| Run No. | A | B | C | D | E |
|---|---|---|---|---|---|
| | | CONTACT CONDITIONS & PRODUCTS | | | |
| Case | Base | O₂ Injection &. Increase Stripper Temperature | Base | O₂ Injection To Stripper | O₂ Injection & Increase Stripper Temperature |
| Feed Rate, GM/M | 10.08 | 10.10 | 10.67 | 10.68 | 10.68 |
| Wt % S in Feed | 0.58 | 0.58 | 2.45 | 2.45 | 2.45 |
| Coke Yield, GMS | 32.23 | 31.52 | 40.68 | 47.86 | 35.71 |

| Run No. | A | B | C | D | E |
|---|---|---|---|---|---|
| | \multicolumn{5}{c}{-continued} | | | | |
| | \multicolumn{5}{c}{CONTACT CONDITIONS & PRODUCTS} | | | | |
| Regenerator | 32.23 | 20.54 | 40.68 | 39.53 | 25.62 |
| Stripper | — | 10.98 | — | 8.33 | 10.09 |
| Wt % Sulfur Liberated in Stripper/Total Coke Yield | — | 1.4 | — | 4.66 | 5.57 |
| CSC | 0.76 | 0.43 | 0.51 | 0.54 | 0.39 |
| CRC | 0.10 | 0.09 0.06 | 0.09 | 0.03 | |
| WT % $H_2$ In Reg. Coke | 4.59 | 0 | 6.53 | 1.75 | 1.72 |
| Conversion | 75.75 | 75.06 | 66.3 | 63.2 | 61.8 |
| C/O | 7.72 | 6.64 | 7.07 | 6.85 | 5.55 |
| Stripper Temp., °F. | 930 | 1200 | 930 | 932 | 1176 |
| Reactor, °F. | 934 | 935 | 929 | 929 | 928 |
| Regenerator, °F. | 1200 | 1197 | 1194 | 1203 | 1202 |
| Catalyst | HEZ-77 TM | HEZ-77 TM | HFZ-33 TM | HFZ-33 TM | HFZ-33 TM |

Data in the table show there was a decrease in sulfur in coke, as evidenced by weight % sulfur in total coke yield liberated in stripper. This sulfur in coke reduction was accompanied by an increase in sulfur as $H_2S$ in the reactor hydrocarbon gas. The data show also that as a result of air injection into the stripper, coke as absorbed hydrocarbon was burned in the stripper, in that the weight % $H_2$ in regenerated coke decreased significantly.

In another preferred embodiment of the invention, principles of the invention are applied to reduce SOx emissions from the flue gas of regenerators in refineries using resids as feedstock to the cracker while improving the operation of the regenerator. When cracking such feeds, absorbed coke will represent a significant portion (e.g., ¾) of coke yield and the coke yield will be high compared to yields experienced when conventional feedstocks are used. The burden of SOx removal from regenerator flue gas will be intolerable if the reactor and regenerator are operated under conventional conditions. To account for this, practice of the invention is preferably modified to incorporate the underlying principle of copending U.S. application, Ser. No. 901,346 filed May 1, 1978, the entire disclosure of which is incoporated herein by cross-reference thereto. In accordance with the disclosure of Ser. No. 901,346, the efficiency of removing SOx from FCC flue gas by contacting the flue gas with a material capable of binding oxides of sulfur in an oxidative environment and releasing the associated oxides of sulfur in the reducing atmosphere of a FCC reactor is improved by contacting the flue gas with such binding agent at a temperature well below that prevailing in the regenerator. That principle is applied as an adjunct to the present invention to reduce SOx emissions in units operating on resid feedstocks while retaining the advantage of controlled high temperature regeneration.

When practicing the present invention using resid feedstock, an agent capable of associating with oxides and sulfur is included in circulating catalyst inventory. Spent catalyst from the resid cracking is charged to the sulfur rejection system of the invention wherein coke is partially burned and vapors including $H_2S$, CO, $CO_2$ and $H_2O$ are separated from partially combusted catalyst which is then charged to the regenerator to combust residual coke. Since residual coke is low in hydrogen, or is free from hydrogen, partial combustion in the separate sulfur rejection system of the invention permits the regenerator to be operated at a significantly lower temperature than would normally be feasible, the lower temperature facilitating the effectiveness of the SOx binding material. Optionally partially regenerated catalyst discharged at high temperature from the sulfur rejection system is contacted with a cooled stream of regenerator flue gas whereby partially regenerated catalyst and flue gas are contacted at a lower temperature than that prevailing in the regenerator proper.

We claim:

1. In a process for catalytic cracking of a sulfur containing hydrocarbon charge by contacting said charge at cracking temperature with a circulating inventory of cracking catalyst whereby the catalyst acquires an inactivating carbonaceous deposit containing sulfur, separating vaporous products of reaction from circulating catalyst inventory containing said carbonaceous deposit, regenerating said inventory with air at a temperature to burn said carbonaceous deposit thus generating oxides of carbon and sulfur and regenerating the catalyst, separating products of combustion from regenerated catalyst, and returning regenerated catalyst to renewed contact with hydrocarbon charge, the improvement which comprises:

regenerating said separated inventory by first contacting it with a source of $O_2$ in the presence of steam using a predetermined quantity of $O_2$ so limited as to partially oxidize carbon in said carbonaceous deposit while eliminating substantially all hydrogen therein, said contacting being further characterized by the use of steam in amount such that a reducing atmosphere is created by steam and by carbon monoxide resulting from partial oxidation of said carbon and being carried out under conditions to substantially reduce the content of sulfur in said carbonaceous deposit and produce vaporous products of partial oxidation essentially free from oxides of sulfur and including hydrogen sulfide, carbon monoxide, as aforesaid, carbon dioxide and water vapor, separating said vaporous products of partial oxidation from the resulting partially regenerated inventory containing residual carbon now having a substantially reduced sulfur content, thereafter contacting said partially regenerated inventory with air to burn residual carbonaceous deposit and separating products of combustion from regenerated catalyst, whereby there are reduced amounts of oxides of sulfur and carbon in said products of combustion separated from regenerated catalyst as a result of prior reduction in the amount of sulfur and carbon in said carbonaceous deposit by partial oxidation as aforementioned.

2. The process of claim 1 wherein air is the source of $O_2$ used to oxidize partially said carbonaceous deposit.

3. The process of claim 1 wherein said inventory is partially regenerated by first contacting it with steam and, while said inventory is in the presence of steam, introducing said predetermined quantity of $O_2$.

4. The process of claim 1 wherein said inventory containing inactivating carbonaceous deposit is contacted with $O_2$ and steam in a vessel separate from a vessel in which said inventory is cracked and separate from a vessel in which said inventory is regenerated.

5. The process of claim 1 wherein said quantity of $O_2$ is predetermined by introducing a source of $O_2$ at a rate such as to burn about one third of the carbon in said carbonaceous deposit.

6. The process of claim 4 wherein gas rich in hydrogen is added to said separated catalyst inventory when it is contacted with $O_2$ in the presence of steam to enhance removal of sulfur in said carbonaceous deposit on said catalyst.

7. The process of claim 6 wherein said gas rich in hydrogen is dry gas from a fluid cracking catalyst unit.

8. The process of claim 1 wherein the quantity of said $O_2$ is predetermined and controlled by exposing products of combustion from said regenerating step to an SOx analyzer and varying the rate of introduction of said $O_2$ in response to said SOx analyzer to achieve a desired reduced level of SOx emissions in said products of combustion.

9. The process of claim 1 wherein said inventory is contacted with $O_2$ in the presence of steam at a temperature in the range of 900° F. to 1300° F.

10. The process of claim 1 wherein said inventory is contacted with $O_2$ in the presence of steam at a temperature in excess of the temperature of cracking.

11. The process of claim 1 wherein said inventory is cracked at temperature Rx, wherein Rx is in the range of about 800° to 1260° F., and thereafter is contacted with $O_2$ in the presence of steam at a temperature below 1300° F. and in the range of about Rx +50° F. to Rx +500° F.

12. The process of claim 1 wherein said inventory is cracked at a temperature of Rx, wherein Rx in the range of about 900° F. to 1100° F. and said inventory is contacted with $O_2$ in the presence of steam at a temperature of about Rx +200° F., said temperature being below 1300° F.

13. The process of claim 1 wherein said inventory is cracked at about 900° to 1100° F., contacted with $O_2$ in the presence of steam at about 1250° F. and then regenerated at a temperature of about 1200° F. under conditions such that combustion products include carbon monoxide and carbon dioxide.

14. The process of claim 4 wherein said vapors containing hydrogen sulfide, carbon monoxide, carbon dioxide and steam are scrubbed to remove sulfur-containing material, whereby the remainder is low BTU fuel which is recovered.

15. The process of claim 1 wherein steam is used at rates ranging from about 0.5 to 10 pounds per 1000 pounds of circulating catalyst inventory.

16. In a system for continuous cyclic catalytic cracking of hydrocarbons which includes a reactor for cracking the hydrocarbons in the presence of circulating catalyst inventory, a regenerator for burning carbonaceous deposit from circulating catalyst inventory, means for cycling catalyst inventory from said reactor to said regenerator and then back to said reactor, means for separating gaseous products of reaction from circulating catalyst inventory and recovering them, and means for separating and discharging products of combustion from said regenerator, the improvement which comprises a vessel separate from said reactor and separate from regenerator, means for discharging catalyst inventory from said reactor into said vessel, means for discharging catalyst inventory from said vessel into said regenerator, means for charging a mixture of steam and a predetermined quantity of $O_2$ into contact with catalyst inventory in said vessel under partial combustion conditions, means for separating vapors obtained from said contact from circulating catalyst inventory and for recovering said vapors, means for circulating catalyst inventory so-contacted thus separated to said regenerator, means for passing products of combustion from said regenerator into an $SO_x$ analyzer and means for varying the rate of introduction of said predetermined quantity of $O_2$ into said vessel in response to said $SO_x$ analyzer.

17. In a process for catalytic cracking of a sulfur containing hydrocarbon charge by contacting said charge at cracking temperature with a circulating inventory of cracking catalyst whereby the catalyst acquires an inactivating carbonaceous deposit containing sulfur, separating vaporous products of reaction from circulating catalyst inventory containing said carbonaceous deposit, stripping the separated circulating catalyst inventory with steam in conventional manner, regenerating said inventory with air at a temperature to burn said carbonaceous deposit thus generating oxides of carbon and sulfur and regenerating the catalyst, separating products of combustion from regenerated catalyst, and returning regenerated catalyst to renewed contact with hydrocarbon charge, the improvement which comprises:

regenerating said separated steam-stripped catalyst inventory by first contacting it with $O_2$ in the presence of steam charged at a rate ranging from about 0.5 to 10 pounds per 1000 pounds of circulating catalyst inventory and at a temperature below 1300° F., said oxygen being charged in a predetermined quantity so limited as to partially oxidize carbon in said carbonaceous deposit while eliminating substantially all hydrogen therein and produce vaporous products of partial oxidation including hydrogen sulfide, carbon monoxide, carbon dioxide and water vapor, separating said vaporous products of partial oxidation from the resulting partially regenerated inventory now having a reduced content of sulfur and carbon, thereafter contacting the inventory so treated with air to burn remaining carbonaceous deposit, and separating products of combustion from regenerated catalyst, whereby there is a reduced amount of oxides of sulfur and carbon in said products of combustion separated from regenerated catalyst as a result of prior removal of sulfur as hydrogen sulfide and carbon as oxides during partial oxidation.

18. The process of claim 17 wherein said circulating catalyst inventory is contacted with $O_2$ in the presence of steam in a vessel separate from a reactor in which cracking and steam stripping takes place and separate from the regenerator, and the catalyst in said vessel is in the form of a dense fluidized bed.

19. The process of claim 17 wherein said circulating catalyst inventory is contacted with said $O_2$ in the presence of steam in a fast fluid riser separate from the reactor in which cracking and steam stripping takes place and separate from the regenerator.

20. The process of claim 17 wherein said quantity of $O_2$ is predetermined by introducing $O_2$ at a rate such as to burn about one third of the carbon in said carbonaceous deposit.

21. The process of claim 17 wherein the quantity of said $O_2$ is predetermined and controlled by exposing products of combustion from said regenerating step to an $SO_x$ analyzer and varying the rate of introduction of said $O_2$ in response to said $SO_x$ analyzer to achieve a desired reduced level of $SO_x$ emissions in said products of combustion 22. The process of claim 17 wherein said inventory is cracked at temperature Rx, wherein Rx is in the range of about 800° to 1260° F., and thereafter is contacted with $O_2$ in the presence of steam in the range of about Rx +50° F. to Rx +500° F.

23. The process of claim 19 wherein said inventory is cracked at a temperature of Rx, wherein Rx is in the range of about 900° F. to 1100° F. and said inventory is contacted with $O_2$ in the presence of steam at a temperature of about Rx +200° F.

24. The process of claim 17 wherein said inventory is cracked at about 900° to 1100° F., contacted with $O_2$ in the presence of steam at about 1250° F. and then regenerated at a temperature of about 1200° F. under conditions such that combustion products include carbon monoxide and carbon dioxide.

25. The process of claim 17 wherein said vapors containing hydrogen sulfide, carbon monoxide, carbon dioxide and steam are scrubbed to remove sulfur-containing material, whereby the remainder is low BTU fuel which is recovered.

* * * * *

UNITED STATES PATENT AND TRADEMARK OFFICE
CERTIFICATE OF CORRECTION

PATENT NO. : 4,274,942
DATED : June 23, 1981
INVENTOR(S) : David B. Bartholic et al It is certified that error appears in the above-identified patent and that said Letters Patent are hereby corrected as shown below:

Column 4 - line 57 should read -- including, by way of example, U. S. Pat. No. 4,071,436 --;

Column 8 - line 57 should read -- WHERE: a = Volume % CO in flue gas --;

Column 9 - line 21 should read -- stocks, roughly 1/3 of the coke is absorbed and the re- --; line 24 should read -- for combustion of about 1/3 the coke yield. Commercial --;

Columns 11 and 12, line 7 of the table should read --

|     | A    | B    | C    | D    | E    |
|-----|------|------|------|------|------|
| CRC | 0.10 | 0.09 | 0.06 | 0.09 | 0.03 |

--.

Signed and Sealed this

First Day of September 1981

[SEAL]

Attest:

GERALD J. MOSSINGHOFF

Attesting Officer

Commissioner of Patents and Trademarks